Sept. 23, 1947. G. B. HANSBURG 2,427,964
BABY WALKER
Filed Feb. 16, 1945
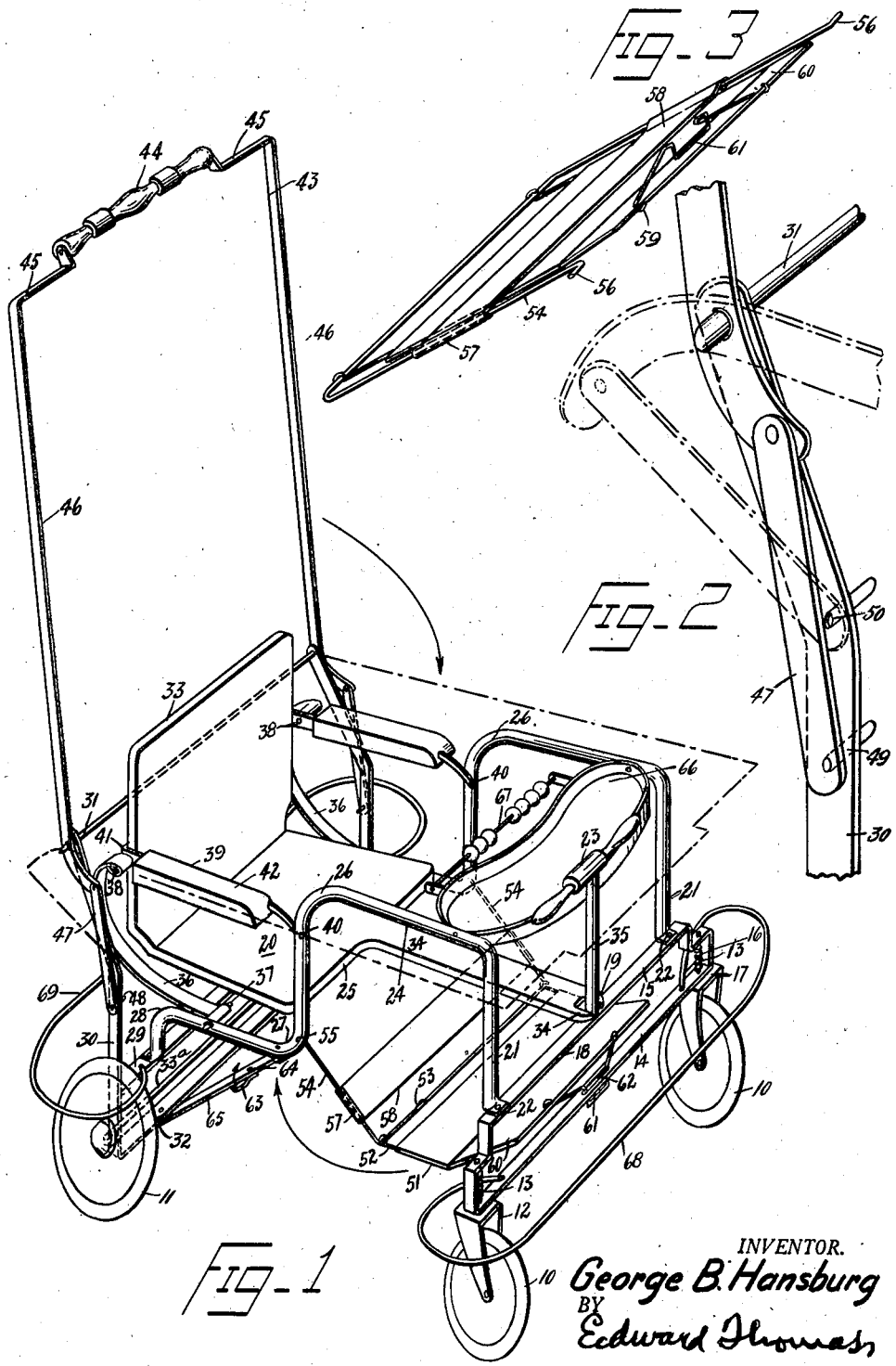
INVENTOR.
George B. Hansburg
BY
Edward Thomas
Attorney Patented Sept. 23, 1947

2,427,964

UNITED STATES PATENT OFFICE 2,427,964

BABY WALKER

George B. Hansburg, Brooklyn, N. Y.

Application February 16, 1945, Serial No. 578,314

3 Claims. (Cl. 155—22)

This invention relates to baby walkers and is herein disclosed in some detail as embodied in a baby walker with a foldable handle and foldable foot-rest.

Baby walkers have been on the market for many years. Some were awkward and built of parts held in fixed position.

Some had removable handles and removable foot rests and proved troublesome because the removed handle or the removed foot rest was easily lost or easily misplaced.

Some were objected to by authorities on hygienic grounds because the seats were narrow and cramped the body and arms of the child in addition to other objections.

In most prior baby walkers the seat formed the back bone of the device with the result that the child seated thereon received all the jars incident to the pushing of the wheels over obstructions.

Many baby walkers were expensive to build and unsatisfactory when built, including those which had fixed foot rests so that the child had to learn to walk without aid of the device.

According to the present invention the foregoing and other objections and disadvantages are overcome and a baby walker is provided which is economical to build and yet has a spring-suspended seat.

In addition to the foregoing, the walker of the present invention is provided with a foldable foot-rest so arranged that it may be folded back under the seat where it is out of the way and the rest can not be lost.

In the form shown, the pushing-handle is pivotally mounted and yet may be firmly held in position to push the walker when folded down where it is out of the way.

The solid arms of the seat may serve as pivots on which it swings freely on the springs and gives the child an opportunity to amuse itself by bouncing up and down on the spring-supported seat.

Other features and advantages will hereinafter appear.

In the accompanying drawing

Fig. 1 is a perspective view of the baby walker ready to hold a child and to be pushed by its handle.

Fig. 2 is an enlarged detail showing a device for holding the handle in position.

Fig. 3 is a perspective view of the folded foot rest.

The baby walker shown runs on front wheels 10 and rear wheels 11. The front wheels are shown as journalled in the usual swivelled casters 12, which turn on pivot rods 13. The rods are shown as passing through lower transverse bars 14 and upper transverse bars 15, so that springs 16 encircling the rods 13 may bear on the underside of the bar 15 and support the frame resiliently by rests (not shown) in the rods 13 against which the springs thrust and normally hold the front of the walker clear of the flat tops 17 of the casters 12.

The top transverse bar 15 includes a stepped up center 18 on which the front end 19 of the seat 20 is adapted to rest. From the stepped up center 18 spring the side frame tubular bars 21, which are riveted to the top of transverse bar 15 at their bent over flattened ends 22, and rise vertically to about the height of the usual handle 23 and thence extend horizontally backward at 24 nearly as far as the front 25 of the seat 20.

Then the bars 21 bend almost vertically downward at 26 to a little below the level of the seat 20, and then run rearward from 27, and then bend downward at 28 nearly over the rear crossbar 29, which forms part of the rear frame, and to which bent-over ends of the bars 21 are riveted.

The rear frame includes a vertical end bar 30 which extends upward to support a handle pivot 31, and extends downward, where it is bent to form a bottom cross bar 32, and, between the bars 29 and 32, it supports a cross-axle bar 33a on which the rear wheels 11 are shown as journalled.

The seat 20 includes a nearly vertical back 33, united in any suitable manner to the bottom part 20, preferably rigidly united, so that the seat structure forms a unit which rests slidably on the bar 15 with its narrow-forked end 34 loosely embracing the post 35 of the handle 23.

The seat 20 is shown as supported on half-loop springs 36 which may be carried by inwardly projecting pins 37 inserted through the tubular bars 21 between the turns 27 and 28, and sweep upwardly and rearwardly somewhat beyond the back 33, and then arch forwardly to pins 38 carried on the back 33.

To guide the seat 20 in its resilient support on the springs 36, the horizontal side seat arms 39 are shown as pivoted at 40 in the bar 21 below its bend 26, and as fastened by straps 41 to the rear of the back 33. The rear arms 39 are preferably covered with wood arm rests 42.

The pivot rod 31 forms a convenient support for a U-shaped square cornered handle 43, which is shown with a flat hand-hold 44, and projections 45, so that the long sides 46, when folded down, lie outside the handles 42 and side bars 21.

In this form the handle 43 may be swung on its pivot rod 31 which passes through backward slanting extensions of the bar 30, and when down is just clear of the handle 23.

The handle 43 in Fig. 1 is shown held in the nearly erect position by a link 47, pivoted to forwardly bent downward extensions of the side bars 46 and provided with a pin 48 shown in a hole 49 in the bar 30 to support the handle 43.

The pins 48 may be removed from their holes 49 by pushing the links 47 sideways and the handle 43 pushed forward and down until horizontal. It may be held in that position by pushing the pins 48 into upper holes 50 as shown in broken lines in Fig. 2.

The foot rest is shown as including a bottom board 51, which may be stamped metal, pivoted by an end rod 52 to a cross reach 53 of a bail having side arms 54 which, in turn, are pivoted at 55 in the tubular bars 21 near the bends 27 by turned-over ends 56. The bail arms 54 are shown as embraced by the turned-over ends 57 of a cross-board 58, and the board 58 may be stiffly slidable on the arms 54.

The foot rest is shown as supported in front by a wire bail having turned-over ends 59 hooked into a hinged board extension 60 of the board 51, its bail also including a broad hooked center 61 which is adapted to catch and be held in a slot 62 in the cross-bar 14, and thus hold the whole foot rest in convenient position to support the child's feet.

When the foot rest is not wanted for use, it folds back on its pivots 56, completely out of the way, and hinges 52, under the seat 20 and may be held there by a turntable latch 63 pivoted at 64 on a strap 65 running from the bend 27 to the bottom rear cross bar 32, the strap serving partly as a diagonal brace.

The walker also is shown as including the usual tray 66, and the rod 67 with beads to amuse a child, and the usual rubber-covered front and rear fenders 68, 69 near the wheels 10 and 11, supported on the front cross bar 14 and rear cross bar 29. It will be noted that the side bars 21 at their high horizontal reaches 24, at the height of the handle 23, form side bars of the enclosure between the seat and tray 66 so as to give the child a safe enclosure within which the child may stand on the ground and may use the reaches 24 as hand holds.

It will be noted that the wheels or casters 10 are at the corners of the frame and that the springs 36 are outside of the seat 20, so as to produce a structure in which a spring is outside of the weight if the device begins to tilt, thus forming an anti-tipping structure.

Moreover, the tray 66 is shown as attached to the side reaches 24 and to the post 35, thus serving to give strength to a light structure.

Having thus described in some detail certain embodiments of the invention, what is claimed is:

1. In a baby walker a seat having a long narrow front extension, an oblong supporting frame having wheels at the corners and a post on the front of said frame, means on said extension engaging said post to hold the extension thereon, a long semi-elliptical spring on each side of the seat and outside the same, means attaching an end of each of the respective springs to said supporting frame with the springs projecting upwardly above the frame and adjacent the side edges thereof and means connecting the seat to the upper ends of said springs in depending relation therebetween, said supporting frame including an arched side member at each side of the frame rising from near the wheels to above the seat to form handholds for a child in the seat.

2. In a baby walker a seat and back-rest unit having a long narrow front extension, an oblong supporting frame having wheels at its corners and a post on the front of said frame, means on said extension engaging said post to hold the extension thereon, arms for the seat attached to the back, long semi-elliptical springs spaced to be on opposite sides of the seat, means attaching a bottom end of each of said respective springs to said supporting frame with the springs projecting upwardly above the frame and adjacent the side edges thereof and means connecting said unit at the rear end of its arms to the upper ends of said springs and between them in depending relation therebetween, said supporting frame including an arched side member at each side of the frame rising from near each rear wheel to above the seat to form hand-holds for a child in the seat and falling to near the front wheels, and a front handle device rising from said post and anchored to said arched members to steady it.

3. In a baby walker a seat and back-rest unit having a long narrow front extension, an oblong supporting frame having wheels at its corners and a post on the front of said frame, means on said extension engaging said post to hold the extension thereon, arms for the seat attached to the back, long semi-elliptical springs spaced to be on opposite sides of the seat, means attaching a bottom end of each of said respective springs to said supporting frame with the springs projecting upwardly above the frame and adjacent the side edges thereof, and means connecting said unit at the rear end of its arms to the upper ends of said springs and between them in depending relation therebetween, said supporting frame including an arched side member at each side of the frame rising from near each rear wheel to above the seat to form hand-holds for a child in the seat and falling to near the front wheels, a foot-rest pivoted beneath the seat to be swung to a position beneath the seat, means holding it there, means for supporting the foot rest below the seat and in advance thereof, and a front handle device rising from a position between the front wheels and anchored to said arched members to steady it.

GEORGE B. HANSBURG.

REFERENCES CITED

The following references are of record in the file of this patent:

UNITED STATES PATENTS

| Number | Name | Date |
|---|---|---|
| Re. 19,139 | Gill et al. | Apr. 17, 1934 |
| 262,545 | Lewis | Aug. 8, 1882 |
| 291,263 | Ackley | Jan. 1, 1884 |
| 1,184,364 | Loshbough | May 23, 1916 |
| 1,696,126 | Salmon | Dec. 18, 1928 |
| 1,778,513 | Siebert | Oct. 14, 1930 |
| 1,987,385 | Back | Jan. 8, 1935 |